United States Patent [19]

Krimmer

[11] Patent Number: 5,293,144
[45] Date of Patent: Mar. 8, 1994

[54] ELECTRIC ROTARY ACTUATOR

[75] Inventor: Erwin Krimmer, Pluederhausen, Fed. Rep. of Germany

[73] Assignee: Robert Bosch GmbH, Stuttgart, Fed. Rep. of Germany

[21] Appl. No.: 828,929
[22] PCT Filed: Jul. 25, 1990
[86] PCT No.: PCT/DE90/00566
  § 371 Date: Jan. 31, 1992
  § 102(e) Date: Jan. 31, 1992

[30] Foreign Application Priority Data

Aug. 11, 1989 [DE] Fed. Rep. of Germany ....... 3926610

[51] Int. Cl.$^5$ ............................................. H01F 7/08
[52] U.S. Cl. .................................... 335/272; 335/229
[58] Field of Search ................ 335/272, 278, 229–230, 335/177, 181–183, 131–132; 310/156

[56] References Cited

U.S. PATENT DOCUMENTS

| | | |
|---|---|---|
| 3,134,404 | 5/1954 | Ziccardi . |
| 3,206,160 | 9/1965 | Bennett . |
| 3,435,394 | 3/1969 | Egger . |
| 4,321,571 | 5/1982 | Meyer ................................. 335/272 |
| 4,491,815 | 1/1983 | Idogaki et al. ....................... 335/229 |
| 4,903,578 | 2/1990 | Terp .................................... 335/229 |

FOREIGN PATENT DOCUMENTS

| | | |
|---|---|---|
| 1127470 | 4/1962 | Fed. Rep. of Germany . |
| 1284212 | 1/1968 | Fed. Rep. of Germany . |
| 1589733 | 3/1970 | Fed. Rep. of Germany . |
| 1679332 | 4/1971 | Fed. Rep. of Germany . |
| 3340060 | 12/1984 | Fed. Rep. of Germany . |

Primary Examiner—Lincoln Donovan
Attorney, Agent, or Firm—Michael J. Striker

[57] ABSTRACT

An electric rotary actuator, particularly for controlling a throttle cross-section in a line conducting operating fluid of an internal combustion engine has a housing, motor actuating unit including windings and magnetic poles located in the housing and magnetic armature rotatable relative to the windings and to the magnetic poles, a throttle. The housing has ducts leading into an interior space between the windings and each having an end at another end face of the armature. The armature has at least one cutout extending in an axial direction and bringable in alignment with the ducts. The armature forms the throttle member through which a fluid to be controlled is conducted.

10 Claims, 1 Drawing Sheet

ELECTRIC ROTARY ACTUATOR

BACKGROUND OF THE INVENTION

The present invention relates to an electric rotary actuator. More particularly it relates to an electric rotary actuator, particularly for controlling a throttle cross-section in a line conducting operating fluid of an internal combustion engine which has a housing enclosing a motor actuator with windings and magnetic poles and a rotatable magnetic armature connected to a throttle member. Such rotary actuators are known, for example, from German Offenlegungsschrift 37 28 589 (=U.S. Ser. No. 203 800) and conventionally consist of an electric motor actuator, on the protruding, extended armature shaft of which a throttle member is mounted which is arranged in a fluid-conducting line. This rotary actuator thus requires a relatively large constructional space and additional seals between throttle member and motor actuator in order to prevent unwanted fluid leakages.

SUMMARY OF THE INVENTION

Accordingly, it is an object of the present invention to provide an electric rotary actuator which avoids the disadvantages of the prior art.

In keeping with these objects and with others which will become apparent hereinafter, one feature of the present invention resides, briefly stated, in an electric rotary actuator of the above mentioned rotary type in which the housing has ducts leading into an interior space between the windings and each of which ends at another end face of the armature, and the armature has at least one cutout extending in an axial direction and bringable into alignment with the ducts, and the rotatable armature forms the throttle member through which the fluid to be controlled is conducted.

When the electric rotary actuator is designed in accordance with the present invention, it has the advantage that it is of much smaller and more compact construction, needs fewer individual parts and the prevention of fluid leakage is facilitated. This is achieved by the fact that the armature of the motor actuator itself forms the throttle member through which the fluid flows.

In accordance with another feature of the present invention, the wall of one of the ducts forms a control opening acting in conjunction with the throttle member. As a further measure for simplification, all stationary motor parts are injection moulded into a plastic housing. It is also advantageous to support the armature axially adjustably in order to be able to adjust the gap between throttle member and control opening which determines the leakage rate.

The windings can be injection molded in plastic and sealed with respect to the interior space through which the fluid flows. The stator accommodating the windings can be molded in without gap and provided with an impermeable coating towards the fluid space.

The armature can be permanently connected to a point-supported shaft. On the other hand, it can be connected to a shaft which is axially supported on the balls. The axial position of the shaft can be adjusted in order to adjust the play between the throttle member and the control opening. The shaft can be unilaterally subjected to the force of a spring which axially urges the throttle member in the direction of the control opening.

The cross-section of the ducts and of the cutouts can be approximately circle-segment-shaped.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
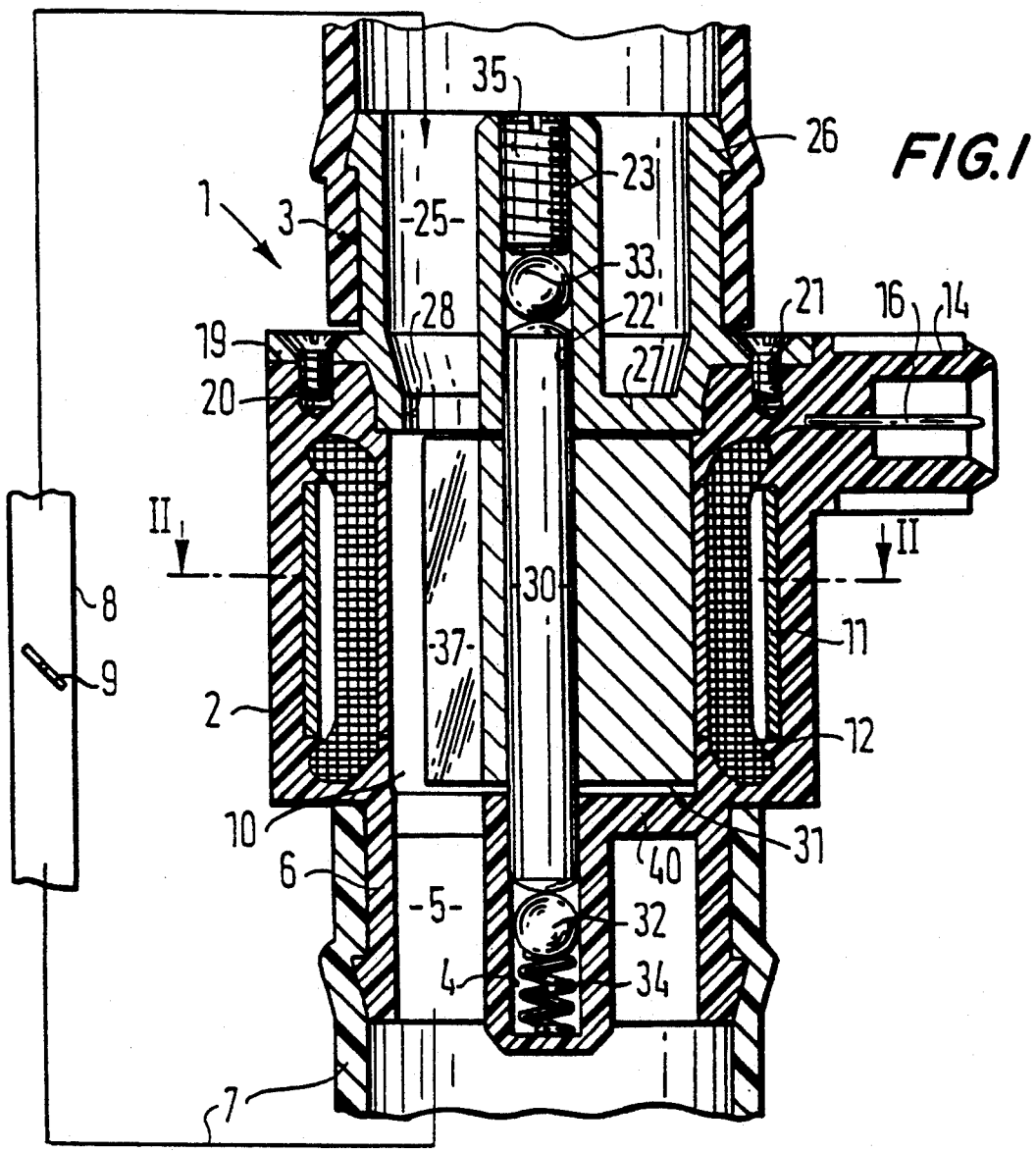
FIG. 1 shows a rotary actuator in longitudinal section according to line I—I in FIG. 2.

A rotary actuator 1 has a 2-part housing consisting of a cup-shaped housing part 2 of plastic and a connecting part 3 which is placed on the former and screwed to it. The housing part 2 encloses an interior space 10, starting from which a central hole 4 extends via a housing bottom 40 of the housing part 2 and an adjoining connecting stub 6. On the side of the hole 4, a duct 5, which is connected to the interior space 10 through which the fluid flows, extends in the axial direction of the housing part 2 inside the connecting stub 6. The connecting stub is used for connecting a by-pass line 7 to an intake tube 8 with throttle flap 9 for controlling the combustion air of an internal combustion engine.

Two stator windings 12 wound onto a laminated stator 11 which is slotted on the outside are cast into the housing part 2. These windings are cast-in or coated with a thin layer also with respect to the interior space 10. The windings are distributed in such a manner that their resultant field vectors are perpendicular to one another. On the side of the housing part 2, a rectangular plug-in socket 14 with three connecting tabs is attached, one of which (16) is visible. Two connecting tabs are in each case connected to one end of the windings 12. The other ends of the windings are jointly connected to the third connecting tab 16. On the end face 19 of the housing 2, facing away from the connecting stub 6, threaded holes 20 are arranged for screws 21 for mounting the connecting part 3. The connecting part has a central hole 22 which, facing away from the housing part 2, is partially provided with an internal thread 23. On the side of the hole 22, a duct 25 extends in its axial direction in the connecting part 3. It leads into the interior space 10 of the housing part 2 and is in alignment with the duct 5. The connecting part 3 forms a stub 26, similar to the connecting stub 6, for connecting the by-pass line 7 and is closed off towards the housing part 2 by a bottom 27 which is penetrated by the duct 25 and hole 22. The edge between bottom 27 and duct 25 forms a control opening 28.

In the holes 4, 22, a shaft 30 of a permanent-magnetic armature 31 is axially supported on balls 32, 33. The ball 32 is supported with a spring 34 on the bottom of the hole 4 which, for example, is constructed to be a blind hole. The ball 33 is held height-adjustably by a threaded pin 35 inserted into the thread 23. The armature 31 has in cross section (see FIG. 2) a bone-like shape or a shape similar to an ignition armature. It is produced by the fact that, opposite one another, two cutouts 36, 37 extending in the axial direction are removed from an originally cylindrical part. The remaining cylinder sections form the poles 38, 39 of the armature 31. One of the cutouts 37 is in alignment with the two ducts 5, 25 in the position shown in FIG. 1. With its cutouts 36, 37 and its poles 38, 39, the armature 31 forms a mechanical throttle member for the fluid conducted through the ducts 5, 25. The stream of fluid through the rotary actuator 1 is controlled by rotation of the armature or throttle member 31. This is done in familiar manner by applying a suitable voltage to the stator windings 12, 13, so that a magnetic field acting on the permanent magnet poles 38, 39 of the armature 31 is produced. When the armature 31 is rotated, it partially or wholly closes the control opening 28 with its poles 38, 39. An oppositely directed rotation of the armature causes the control opening 28 to open until the full control cross section is open again when the cutout 37 corresponds to the ducts 5, 25. The gap between the end faces, facing one another, of throttle member 31 and bottom 27 of the connecting part 3 can be easily adjusted by rotating the threaded pin 35 so their tolerance-related leakage losses are prevented.

The cross sections of the ducts 5 and 25 and thus also of the control opening 28 can be round, triangular, rectangular or of similar construction. The cross sections of the cutouts 36 and 37 of the armature 31 can be U-shaped with outwardly tilted legs (as shown), triangular, rectangular or of similar construction.

Figure 2:
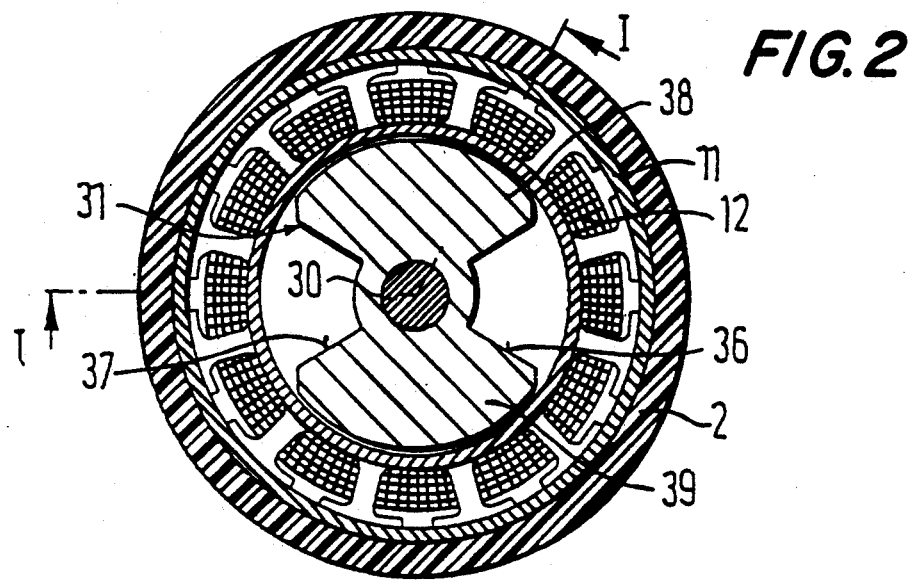
FIG. 2 shows a cross section through the rotary actuator according to line II—II in FIG. 1.

The duct cross sections and the cutout cross sections are preferably identical and, to achieve the largest possible flow cross section, are approximately circle-sector-shaped or trapezoidal as shown in FIG. 2.

The invention is not restricted to the concrete illustrative embodiment. In particular, the armature can also be driven by other stator arrangements. The axial and radial bearing of the armature shaft can also be replaced by other known bearings, for example by a bearing on points instead of on balls. To enlarge the control cross section, it is also possible to construct in each case two oppositely located ducts in each housing part, which then communicate with in each case one armature cutout.

It will be understood that each of the elements described above, or two or more together, may also find a useful application in other types of constructions differing from the types described above.

While the invention has been illustrated and described as embodied in an electric rotary actuator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electric rotary actuator, particularly for controlling a throttle cross section in a line conducting operating fluid of an internal combustion engine, comprising a housing; motor actuating means including windings and magnetic poles located in said housing and a magnetic armature rotatable relative to said windings and to said magnetic poles, said magnetic poles being concentric to said armature; and a throttle member, said housing having ducts leading into an interior space between said windings and each having an end at another end face of said armature, said armature having at least one cutout extending in an axial direction and bringable in alignment with said ducts, said armature forming said throttle member through which a fluid to be controlled is conducted.

2. An electric rotary actuator as defined in claim 1, wherein said housing has a wall forming one of said ducts, said wall having a control opening acting in conjunction with said throttle member.

3. An electric rotary actuator as defined in claim 1, wherein said windings are injection-molded plastic windings and are sealed relative to said interior space.

4. An electric rotary actuator as defined in claim 1, wherein said motor actuator means includes a stator which accommodates said windings and is molded without gap.

5. An electric rotary actuator as defined in claim 4, wherein said stator is provided with an impermeable coating facing said interior space.

6. An electric rotary actuator as defined in claim 1; and further comprising a point-supported shaft, said armature being permanently connected to said shaft.

7. An electric rotary actuator as defined in claim 6; and further comprising balls, said shaft being axially supported on said balls.

8. An electric rotary actuator as defined in claim 6, wherein said housing has a wall defining one of said ducts and provided with a control opening acting in conjunction with said throttle member, said shaft being axially adjustable so as to adjust a play between said throttle member and said control opening.

9. An electric rotary actuator as defined in claim 8; and further comprising a spring which subjects said shaft to a force and axially urges said throttle member in direction of said control opening.

10. An electric rotary actuator as defined in claim 1, wherein said ducts and said cutouts have an approximately circle-segment-shaped cross-section.

* * * * *